United States Patent [19]
Mason

[11] 3,979,911
[45] Sept. 14, 1976

[54] EXPANSION POWER PACK

[76] Inventor: Joseph W. Mason, 3181 Maginn Drive, Xenia, Ohio 45385

[22] Filed: May 8, 1975

[21] Appl. No.: 575,735

[52] U.S. Cl. .................................. 60/509; 60/513
[51] Int. Cl.² .......................................... F03G 7/06
[58] Field of Search ............................. 60/508–515

[56] References Cited
UNITED STATES PATENTS

| | | | |
|---|---|---|---|
| 854,082 | 5/1907 | Danford | 60/507 X |
| 1,376,140 | 4/1921 | Ervin | 60/507 |
| 1,744,288 | 1/1930 | Vorel | 60/513 |

FOREIGN PATENTS OR APPLICATIONS

| | | | |
|---|---|---|---|
| 336,229 | 4/1921 | Germany | 60/513 |

*Primary Examiner*—Allen M. Ostrager
*Attorney, Agent, or Firm*—Bacon & Thomas

[57] ABSTRACT

Three operating chambers, each having an electric heating element therein and simultaneously operated solenoid inlet and outlet valves, are arranged to operate in sequence, each operating chamber having a power piston in communication therewith that engages the driving end of a separate fulcrumed power arm. The three power arms are arranged to jointly rotate a crank shaft through three crank arms, to produce power for operating generators and the like. At the start of an operating cycle for each operating chamber, it is filled with cold starting liquid from a refrigeration unit. The electric heater element is activated for a precise time period to heat and expand the liquid to operate the power piston, and thereafter the inlet and outlet valves are operated to drain the heated liquid and replace it with cold. A control circuit driven from the crankshaft operates the heater elements and the solenoid valves in a precise timed sequence, to ensure maximum efficiency and smooth power output.

19 Claims, 11 Drawing Figures

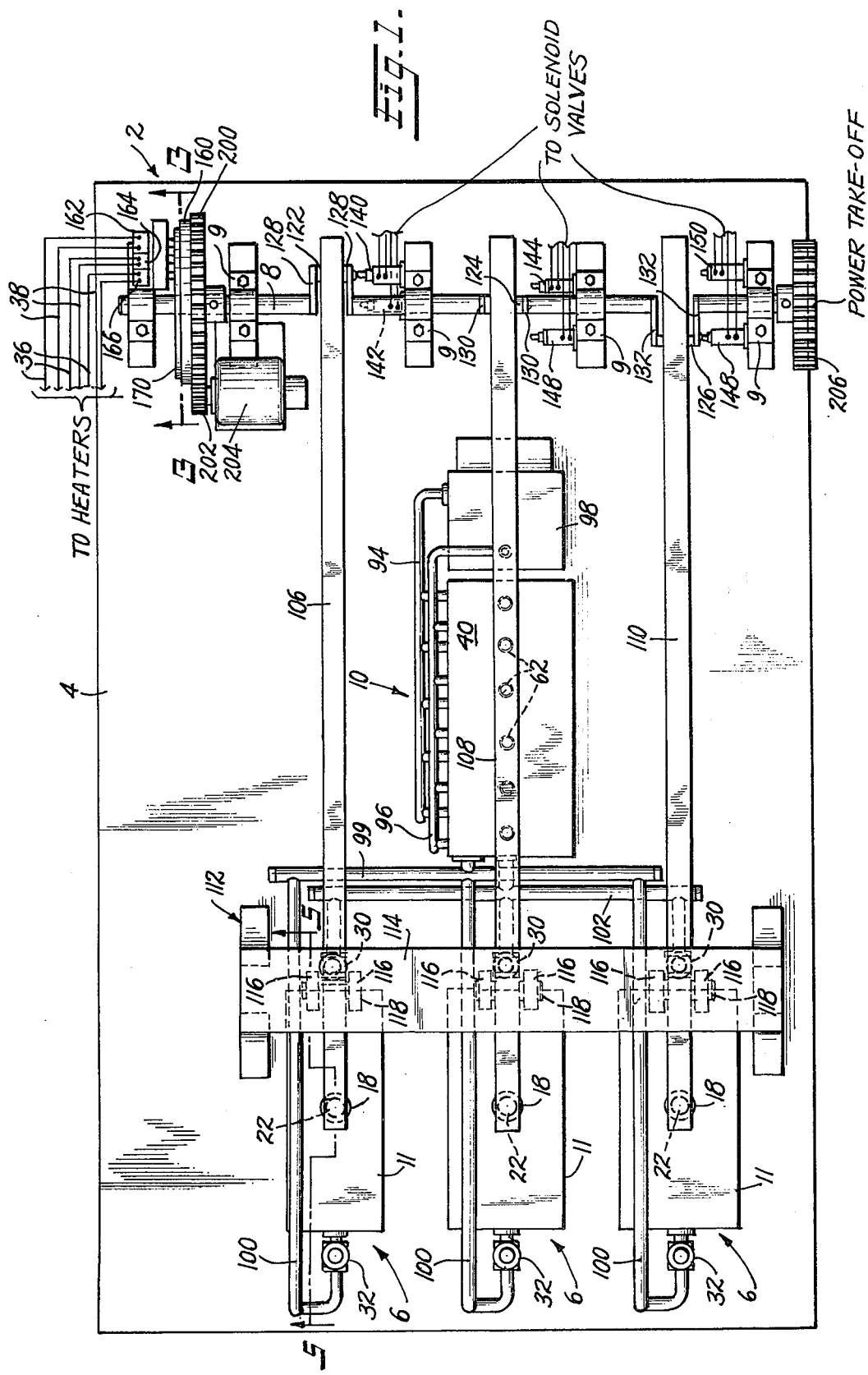

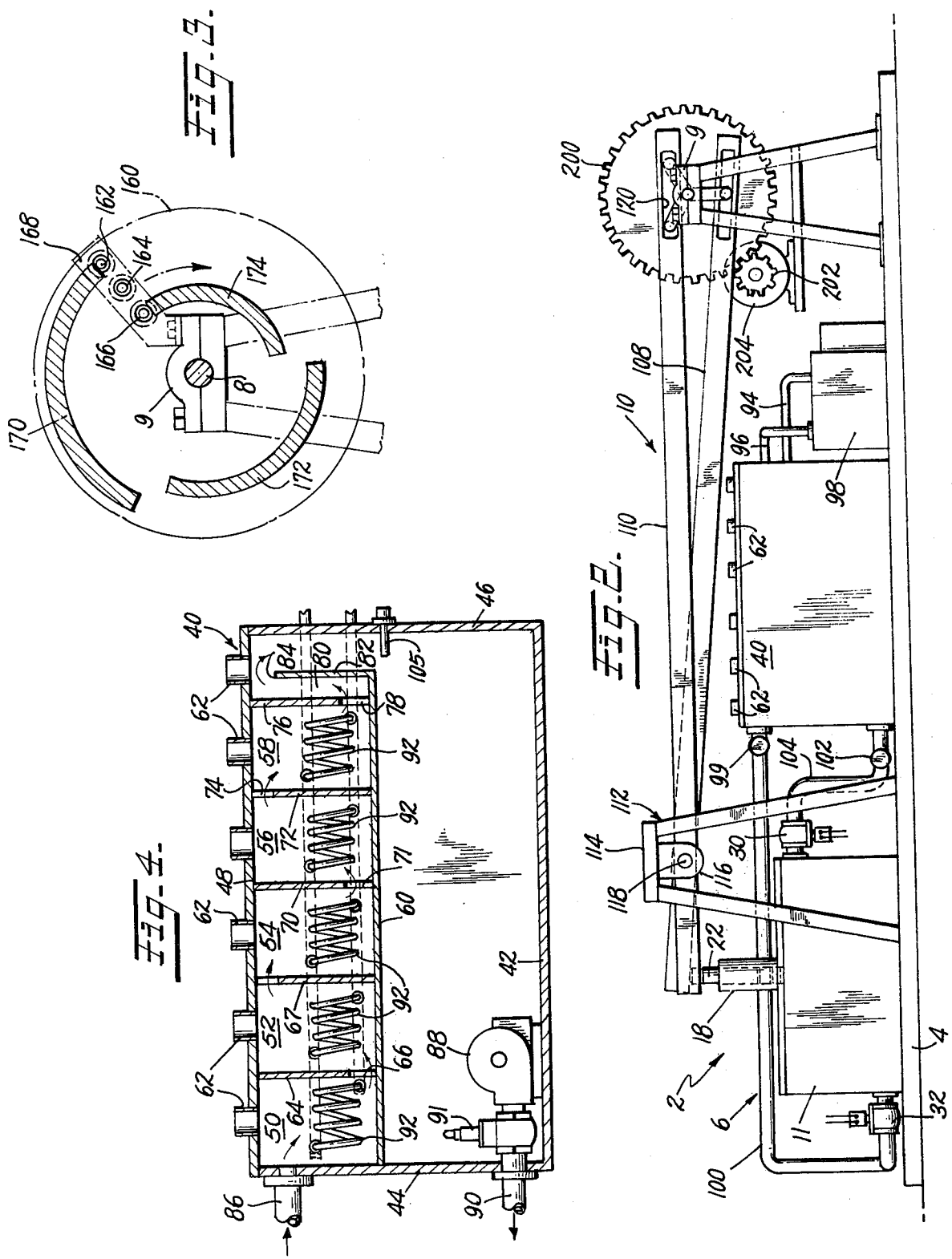

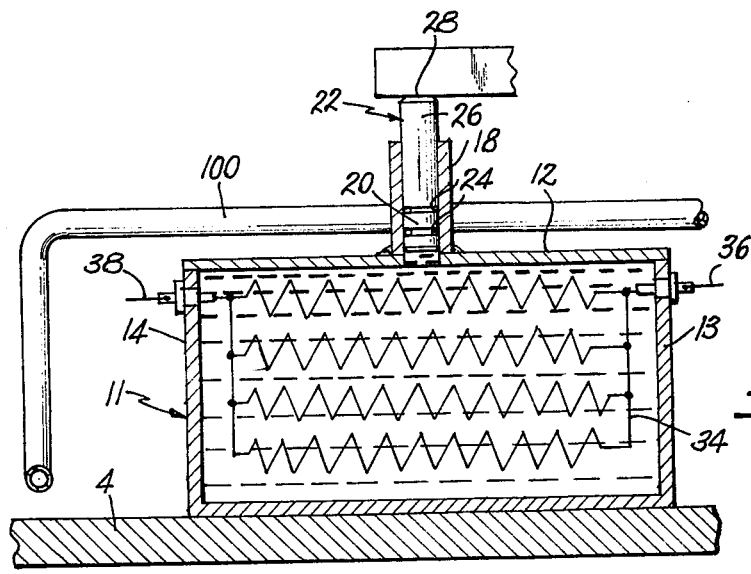
Fig. 5.
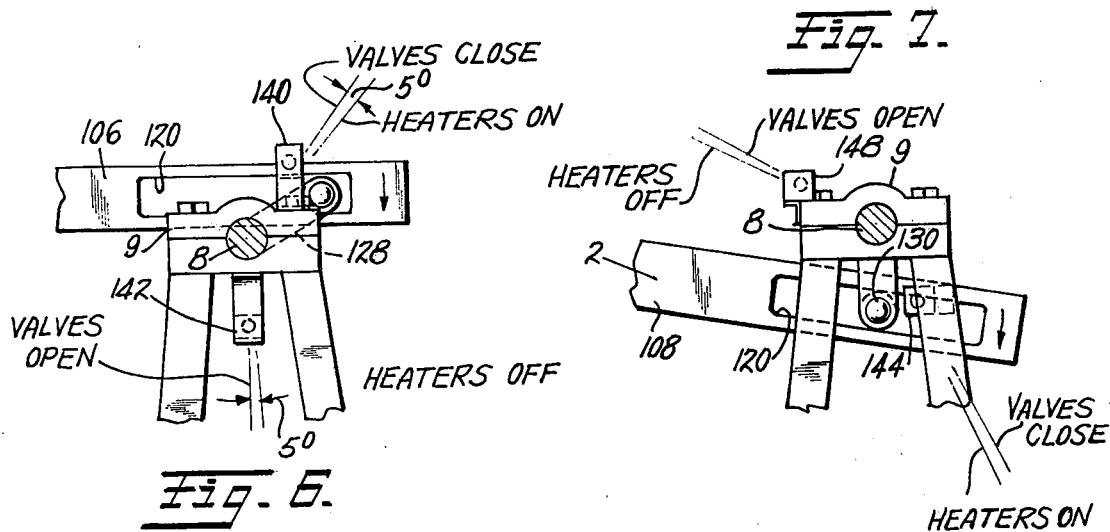
Fig. 7.
Fig. 6.
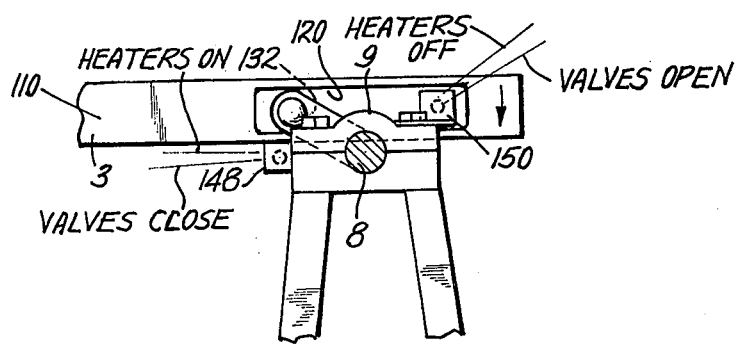
Fig. 8.

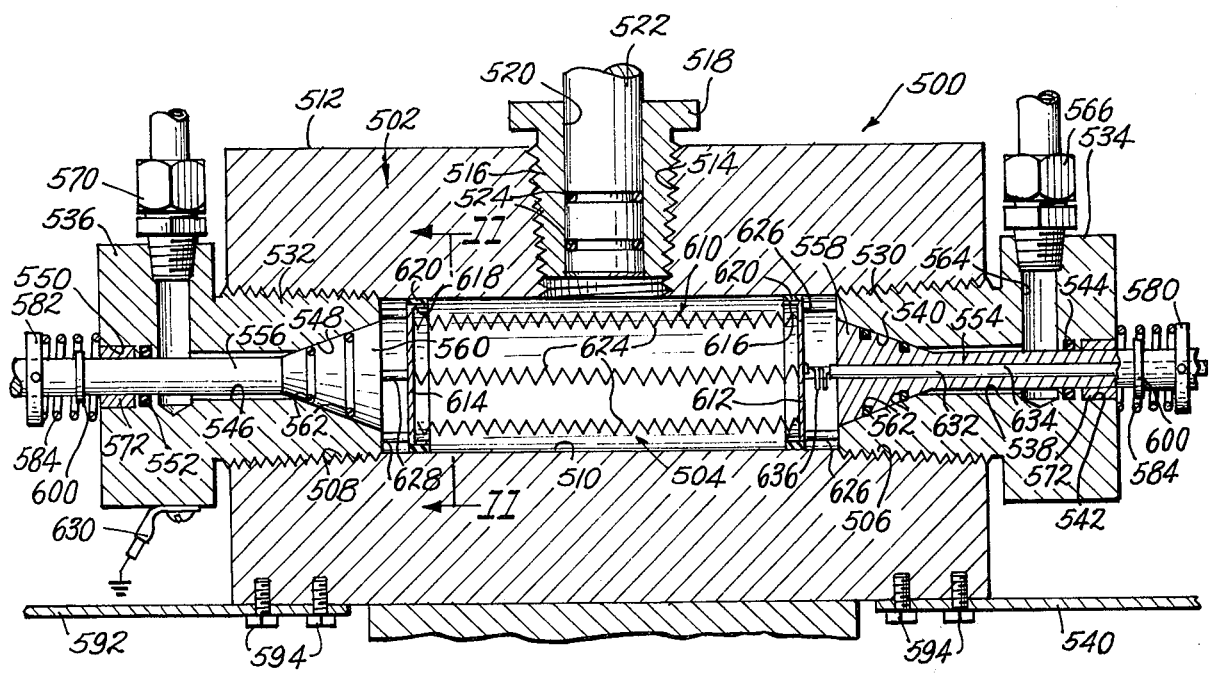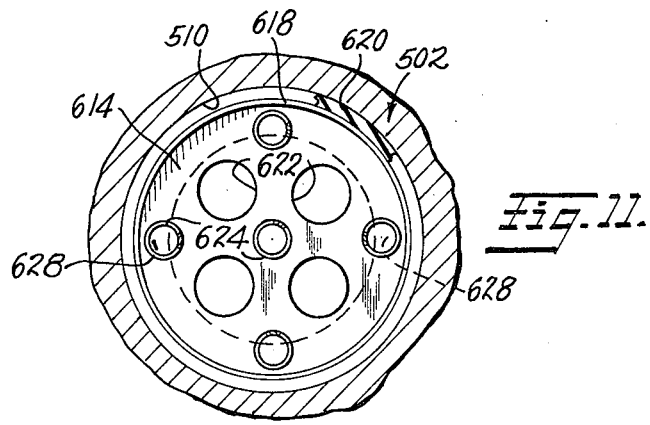

EXPANSION POWER PACK

BACKGROUND OF THE INVENTION

1. Field of the Invention

The present invention relates generally to engines which are operated by the expansion of a fluid maintained in its liquid state, the fluid being expanded by the application of heat thereto to produce mechanical power. More particularly, it relates to an improved engine of this type using a plurality of operating chambers, and provided with a control arrangement designed to ensure maximum efficiency.

2. Description of the Prior Art

A characteristic of water and other liquids is that they expand when heated. Over the years many attempts have been made to take advantage of this characteristic of liquids to produce mechanical motion in an engine, a typical example being the device shown in U.S. Pat. No. 2,660,030. Some of the liquid expansion engines that have been devised have proven more or less effective, but the search has gone on for a better concept that will maximize the capabilities of engines of this general type.

Liquid expansion engines generally have two basic characteristics in common. First, a liquid is heated, to produce expansion that is then utilized to effect a mechanical movement. Second, that mechanical movement is utilized to produce power. In order to obtain an expansion engine of maximum effectiveness, both of these characteristics must themselves be maximized. The improved expansion engine or power pack of the present invention is designed to provide maximum efficiency in the liquid expansion operating phase of the engine, and to then make maximum use of the mechanical movements resulting from expansion of the operating liquid. It thus offers an expansion engine with a level of performance that goes beyond anything heretofore possible.

SUMMARY OF THE INVENTION

The expansion engine or power pack of the present invention is designed to rotate a crankshaft, the output of which is then utilized to drive generators or other equipment, in the usual manner. The engine includes three separate power generating units within which the operating liquid functions to generate mechanical movements, and those mechanical movements are then greatly magnified and transmitted to the crankshaft through three fulcrumed power arms. The power arms are connected by crank arms to the crankshaft, and each power generating unit is effective to drive the crankshaft through 120° of movement.

Each of the power generating units includes an operating chamber for receiving the operating liquid, and which contains a high efficiency, quick starting electric element. The operating chambers each have an inlet and an outlet port positioned at opposite ends thereof, equipped with simultaneously operable solenoid inlet and outlet valves. The inlet valves are connected to the outlet of a refrigeration unit, designed to supply starting operating liquid to the operating chambers at a precise cold temperature. The outlet valves are connected to the inlet of the refrigeration unit, whereby heated liquid is drained from the operating chambers and returned to the refrigeration unit for cooling and subsequent reuse. The use of a single refrigeration unit located separately from the operating chambers maximizes the efficiency of the liquid cooling phase, and the inlet and outlet solenoid valves are designed to ensure quick opening and closing movements, and rapid liquid flow.

A cylinder is connected with each operating chamber, and contains a power piston therein against which the expanding, heated operating liquid acts. The power piston engages the driving end of the associated power arm, located a short distance from the fulcrum for the power arm. The driven end of the power arm is several times the distance from the fulcrum than is the driving end, and is connected with the crank arm for effecting rotation of the crankshaft. Thus, the relatively small movements of the power piston are magnified many times over.

The three crank arms are spaced 120° apart, and the three power generating units are arranged to be operated in sequence so that each generates power for one-third of an operating cycle, during which the crankshaft is rotated through 360°. To effect this timed sequence of operation, a control circuit is arranged to be operated by the rotating crankshaft.

The control circuit includes microswitches that operate the solenoid valves of the three power generating units in proper sequence, and a timing control disc that functions to operate the quick response electric heater elements for the precise time periods required. Through this arrangement, maximum efficiency of the expansion engine or power pack is obtained, and the operation of the three power generating units is properly sequenced so that they blend perfectly with one another to produce a smooth and even rotation of the crankshaft.

The invention also includes a specially constructed power generating unit, designed to be compact and provide maximum efficiency in operation. The unit includes a block housing of substantial wall thickness to provide stable operating temperatures, and which has a bore extending completely therethrough that is threaded at its outer ends. The region of the through bore between its threaded outer ends comprises the operating chamber of the unit, and a transverse bore connects therewith and is threaded to receive a collar mounting the power piston.

Inlet and outlet valve bodies are threaded into the opposite ends of the operating chamber bore, and carry spring biased, solenoid operated valve elements. An electrical heating element assembly is disposed in the operating chamber, and is supplied with electricity through a conduit carried by the valve elements. The arrangement provides a compact power generating unit that is economical to construct, and small in size so that several thereof can be located within a small space.

It is the principal object of the present invention to provide an expansion engine arrangement designed to obtain maximum efficiency from the expansion characteristics of an operating liquid, and maximum effectiveness in turning expansion-generated mechanical movement into rotary power output.

Another object is to provide an expansion engine wherein the operating liquid is heated within one chamber, and cooled within a separate refrigeration unit, whereby to provide both idealized heating and cooling phases of operation.

A further object is to provide an expansion engine utilizing a plurality of separate power generating units to drive a single crankshaft, designed to provide for precision control over the operating cycle of the three units, and to provide for precision sequential operation of said units.

Yet another object is to provide a control mechanism for operating the power generating units of an expansion engine, designed to ensure smooth sequential operation.

It is also an object to provide a compact power generating unit incorporating solenoid inlet and outlet valves, and designed for maximum efficiency.

Other objects and many of the attendant advantages of the present invention will become readily apparent from the following Description of the Preferred Embodiment, when taken in conjunction with the accompanying drawings.

BRIEF DESCRIPTION OF THE DRAWINGS

FIG. 1 is a plan view showing the expansion engine or power pack of the invention, with the three power generating units connected by power arms to crank arms that operate a crankshaft;

FIG. 2 is a side elevational view of the expansion engine of FIG. 1, showing in particular the arrangement for the fulcrumed power arms;

FIG. 3 is a transverse fragmentary sectional view, taken on the line 3—3 of FIG. 1, showing the timing control disc for operating the electric heating elements in precise, timed sequence;

FIG. 4 is a fragmentary vertical sectional view through the cooling tank element of the refrigeration unit of the invention, showing in particular the multi-celled construction thereof;

FIG. 5 is a fragmentary vertical sectional view taken on the line 5—5 of FIG. 1, showing the construction of one of the power generating units;

FIGS. 6, 7 and 8 are diagrammatic views illustrating the sequence operational arrangement for the electric heater elements and the solenoid inlet and outlet valves.

FIG. 9 is an elevational view of a modified power generating unit, designed for maximum compactness and efficiency;

FIG. 10 is a vertical sectional view taken through the unit of FIG. 9, showing in particular the structure of the valves; and FIG. 11 is an enlarged cross-sectional view, taken on line 11—11 of FIG. 10.

DESCRIPTION OF THE PREFERRED EMBODIMENTS

Referring now to FIGS. 1-8 of the drawings, the principal embodiment of the expansion engine of the invention is indicated generally at 2, and includes a base plate 4 near one end of which three power generating units 6 are mounted. A crankshaft 8 is mounted near the other end of the base plate 4 by bracket-supported bearing units 9, and a refrigeration unit 10 is mounted between the power generating units 6 and the crankshaft 8.

The three power generating units 6 are identical, and each includes an operating chamber 11 having a top wall 12 and end walls 13 and 14, the top wall 12 having an opening 16 therein. A short vertical cylinder 18 is welded to the top chamber wall 12 about the opening 16, and receives the lower end 20 of a power piston 22. The lower end 20 of the power piston 22 has annular seals 24 thereon carried in the usual seating grooves to prevent the passage of liquid thereby, and the upper end 26 of said piston projects upwardly from the cylinder 18 and terminates in an end face 28.

The end walls 13 and 14 of the chamber 11 have inlet and outlet ports therein fitted with solenoid inlet and outlet valves 30 and 32, respectively. The solenoid valves 30 and 32 can be of any desired design capable of quick opening and closing, and full liquid flow. However, it has been found that spring-biased needle valves have the characteristics desired, and thus such are preferred.

The interior of the chamber 11 has an electric heating element 34 disposed therein, with the leads 36 and 38 thereof extending through the chamber walls. The electric heating elements 34 can be of any conventional design, capable of instant start and producing high heat. Their function is to quickly heat operating liquid contained within the chamber 11, to cause expansion thereof. The selected heating elements must be capable of raising the temperature of the cold starting liquid sufficiently to produce the expansion thereof called for by design specifications, and to do so repeatedly with substantially identical results each time they are operated.

The solenoid inlet and outlet valves 30 and 32 are connected to be simultaneously operated, as will be described later. In the operation of each generating unit 6, the inlet and outlet valves 30 and 32 are simultaneously opened, to discharge heated liquid used in the preceding operating cycle from one end of the operating chamber 11, while cool starting operating liquid at the design temperature is supplied to the chamber from the other end thereof. When the operating chamber 11 is filled with operating liquid, the valves are closed. At the appropriate time, the heating element 34 is energized, to effect the desired heating of the cool starting operating liquid, and produce the expansion thereof called for by the design specifications. The expanding liquid acts upon the power piston 22, driving it upwardly within the cylinder 18. Heating of the liquid ceases when the flow of energy to the heater element 34 is terminated, thereby terminating the expansion cycle. Thereafter, the solenoid valves 30 and 32 are operated, to terminate one operating cycle and place the generating unit 6 in condition for the next cycle.

The operating liquid for all three power generating units 6 is processed by the single refrigeration unit 10, which includes a cooling tank 40, shown in detail in FIG. 4. Referring to FIG. 4, the cooling tank 40 includes a bottom wall 42, end walls 44 and 46, and a top wall 48. Disposed along the top wall 48, and extending downwardly into the cooling tank 40 for about half the depth thereof, are several cooling cells 50, 52, 54, 56 and 58, all having a common bottom wall 60, and each provided with a vent opening 62 carried by the cooling tank top wall 48.

The first cooling cell 50 is divided from the second cooling cell 52 by a baffle 64 having an opening 66 at the bottom thereof. A similar baffle 67 separates the cells 52 and 54, with an opening 68 being provided at the top of the baffle. The cells 54 and 56 are separated by a baffle 70 with an opening 71 at the bottom thereof, and a baffle 72 separates the cells 56 and 58, and has a top opening 74. The cell 58 has a rear baffle wall 76 with a bottom opening 78 that empties into a flow chamber 80, defined on its outer side by a baffle wall 82 having a top opening 84 therein. It is thus seen that liquid entering the first cooling cell 50 through an inlet 86 will flow in a serpentine manner through the cooling cells 50, 52, 54, 56 and 58, through the flow chamber 80, and then will simply fall into the lower portion of the cooling tank 40, from which it is pumped by a constant pressure pump 88 through an outlet pipe 90, a pressure relief valve 91 being positioned within the cooling tank 40 on the outlet side of the pump 88.

Disposed within each of the cooling cells 50 through 58 is a coolant coil 92, the inlets of all the coolant coils 92 being connected to an inlet manifold 94, and the outlets of all the coils 92 being connected to a collector manifold 96. A refrigerant compressor unit 98 for supplying coolant to the coils 92 is positioned adjacent the cooling tank 40, the inlet thereof being connected to the collector manifold 96, and the outlet thereof being connected to the inlet manifold 94.

The inlet 86 of the cooling tank 40 is connected to a collector manifold 99, to which the outlet solenoid valves 32 are connected by conduits 100. Similarly, the outlet pipe 90 of the cooling tank 40 is connected to a manifold 102, to which the inlet valves 30 are connected by conduits 104.

The cooling tank 40 is uniquely designed to receive the heated operating liquid from the power generating units 6, and to quickly cool it to a prescribed starting temperature, the separate cooling cells 50 through 58 producing the quick cooling action, and the lower portion of the cooling tank 40 serving as a reservoir to hold a large quantity of operating liquid at a constant initial cool starting temperature. By this arrangement, cooling efficiency is maximized, and the separate generating units 6 are assured of cool starting liquid of a constant temperature, which in turn provides for smooth and substantially stable operation of the expansion engine 2. The temperature of the liquid in the cooling tank 40 is monitored by a sensor thermometer 105, which can be connected to control operation of the compressor unit 98.

While the cooling tank 40 as just described is preferred for the invention, at the same time it is to be understood that other designs are possible. The cooling tank arrangement selected must, however, provide for cooling of the warm returned operating liquid within the precise operating time limits of the engine or power pack, and should include the feature of a common large and stable reservoir to assure that all the generating units 6 will receive starting operating liquid at the selected design temperature.

The powerful, limited mechanical movements of the power pistons 22 are transmitted to the crankshaft 8 by means of power arms 106, 108 and 110, one for each of the three power generating units 6. A frame 112 is mounted on the base plate 4 over one end of the power generating units 6, and includes a transverse bridging member 114. Mounted on the undersurface of the bridging member by brackets 116 are three aligned pivot shafts 118, each of which serves as a fulcrum for its associated power arm 106, 108 or 110.

The upper faces 28 of the power pistons 22 impinge against the undersurface of their associated power arms 106, 108 or 110 at the driving end thereof, the lever distance between said driving end and the fulcrum points of the power arms being relatively short. The driven ends of the power arms 106, 108 and 110 are positioned many times further away from the fulcrum point, and have slots 120 therein for receiving the follower cams 122, 124 and 126, respectively, mounted on the outer ends of crank arm pairs 128, 130 and 132 carried by the crankshaft 8. Thus, the limited movements of the power pistons 22 are greatly magnified, as they are applied to rotate the crankshaft 8.

As is best shown in FIGS. 6, 7 and 8, the three sets of crank arms 128, 130 and 132 are spaced apart precisely 120° from each other, and the power generating units 6 associated with each are intended to operate in a sequence such that each set of crank arms will be power driven at the time when it is positioned to be most effective in contributing to the rotation of the crankshaft 8. More specifically, the crank arms and their associated power arms are arranged so that power will be applied to each when they are out of their null position, and in a driving position. By using the three sets of spaced crank arms, it is evident that one thereof will always be in a driving condition, thereby assuring constant driving power on the crankshaft 8.

It should be mentioned at this time that while three power generating units 6 are shown, with three power arms and associated crank arms, it would be possible to utilize another plurality, if desired. The use of a plurality of three has been found to be simple and effective, however, and thus is preferred.

It is evident that if the expansion engine or power pack 2 of the invention is to function with maximum efficiency and smoothness, the crank arm sets must be precisely disposed about the crankshaft 8, and the power generating units 6 must be operated in a precise sequence, and for precise periods of time. The proper sequential operation of the power generating units 6 is especially important, for if this does not occur it is possible that one unit might work against another unit, thereby creating inefficiencies, and probable severe damage to the mechanism.

The present invention includes a control circuit arrangement designed to ensure precision, sequential operation of the power generating units 6. Referring first to FIGS. 6, 7 and 8, it will be seen that "VALVES CLOSE" and "VALVES OPEN" microswitches 140 and 142 are mounted to be operated by the crank arms 128, respectively, these microswitches 140 and 142 being connected by leads to operate the solenoid inlet and outlet valves 30 and 32 on the power generating unit 6 associated with the power arm 106. At the start of a 120° operating cycle for the crank arms 128, the VALVES CLOSE microswitch 140 is positioned to close the associated solenoid valves 30 and 32 at a 60° position past the vertical, whereby the cool starting water for the associated power generating unit 6 is trapped within its operating chamber 11.

Starting 5° after the inlet and outlet valves 30 and 32 are closed, the heating element 34 of the associated power generating unit 6 will be activated, and will quickly heat the operating liquid over the next 100° of movement to effect expansion thereof, after which the energy supply to the heating element 34 will be terminated. The control circuit for the heating elements 34 will be described later. When the operating liquid is heated, it will expand and drive the power piston 22, whereupon the power arm 106 will be effective to cause rotation of the crankshaft 8. At the end of the 120° operating cycle, the VALVES OPEN microswitch 142 will be actuated by the crank arms 128, to effect draining of the heated operating liquid, and its replacement with cool starting liquid from the cooling tank 40. This flow of liquid occurs during the next 240°, until the start of the next operating cycle for the power arm 106.

In a similar manner, the power arm 108 of FIG. 7 and the power arm 110 of FIG. 8 have VALVES CLOSE microswitches 144 and 146, and VALVES OPEN microswitches 148 and 150, respectively, connected to operate the inlet and outlet solenoid valves 30 and 32 of their respective power generating units 6. Again, it is emphasized that this arrangement ensures precise and constant sequential operation of the three power generating units 6, with no possibility of the units getting out of sequence, or interfering with each other's operation. It is understood, of course, that the circuitry for operating the solenoid valves 30 and 32 must include a power supply (not shown), which can be a battery or the like. The heating elements 34 in the operating chambers 11 are controlled by a timing control disk 160 mounted on the crankshaft 8, and which is positioned to confront three brushes 162, 164 and 166 carried on a bracket 168. Each of the brushes 162 through 166 has the leads 36 and 38 from one of the heating elements 34 connected thereacross, the brush 162 being associated with heating element 34 of the power generating unit 6 associated with the power arm 106, the brush 164 being similarly associated with the power arm 108 and the brush 166 being associated with the power arm 110.

As is best shown in FIG. 3, the face of the timing control disk 160 that confronts the brushes 162 through 166 has three arcuate contacts 170, 172 and 174 thereon, each made of copper or the like and having an arc length of 110°. The contacts 170, 172 and 174 are respectively associated with the brushes 162, 164 and 166, and are spaced equally apart a distance of 10°. It is evident that as the timing control disk 160 is rotated by the crankshaft 8, the brushes 162, 164 and 166 will sequentially engage their respective contacts 170, 172 and 174, whereby the circuits to the associated heating elements 34 will be sequentially closed, the circuits containing a suitable power source (not shown), such as a storage battery. The use of a storage battery can provide an even source of power, and is especially useful in some instances.

Referring now again to FIGS. 6, 7 and 8, it will be noted that the respective heating elements 34 are to be switched "ON" 5° after the valves 30 and 32 of the associated operating chambers 11 are closed, and that they are to be switched "OFF" after a subsequent 110° of movement of the crankshaft 8. The timing control disk 160 is so positioned on the crankshaft 8 as to effect the relationship as just described, the resultant control circuit arrangement ensuring precise control of the engine of the invention.

The purpose of the engine or power pack 2 of the invention is to rotate the crankshaft 8, which can then be used to do work. Two different ways of taking mechanical power from the crankshaft 8 are shown in the drawings, and of course other arrangements can be devised.

The rotations of the crankshaft 8 can be converted into electrical energy, and for this purpose the crankshaft 8 is shown to have a large driving gear 200 thereon, engaged with a small driven gear 202 mounted on the shaft of a generator unit 204. Electrical energy from the generator unit 204 can be used for many purposes, and indeed such can be fed back to the battery or the like (not shown) utilized to supply energy to the heating elements 34, to supply energy for operating the solenoid valves 30 and 32, the compressor unit 98, and like purposes.

The crankshaft 8 is also fitted with a gear 206 on its opposite end, which can be utilized to take mechanical power directly from the crankshaft 8.

It is evident from the foregoing that an improved expansion engine or power pack has been devised, which will maximize the generation of useful power. By using the power of expanding water, mechanical movements are generated that are transformed into rotary motion, which is then utilized to generate electricity and do other useful work. The unique control arrangement of the invention ensures proper sequential operation of the three power generating units 6, the supply of electrical energy to the heating elements 34 is precisely timed and occurs precisely when desired by use of the timing control wheel 160, and the use of separate operating chambers 11 but a joint cooling tank 40 helps ensure efficient operation of the device and generation of the maximum power output available.

Referring now to FIGS. 9–11, another embodiment of a power generating unit is shown generally at 500, the unit 500 being especially designed for compactness, economy of construction, and stability of operating temperatures. Because of its compactness particularly, the unit 500 is especially adapted for use where a large plurality of power generating units is desired in connection with a single expansion engine.

The power generating unit 500 includes a housing 502 comprising a rectangular block of substantial width and height, whereby to assure thick chamber walls that will tend to stabilize operating temperatures. The housing block 502 has a cylindrical bore 504 extending axially therethrough, the inlet and outlet ends 506 and 508, respectively, thereof being threaded, and the central bore portion 510 constituting the operating chamber of the unit.

The top surface 512 of the housing block 502 has a centrally positioned, transverse threaded bore 514 therein that intersects the operating chamber 510. A collar 516 having a wrench heat 518 thereon is threaded into the vertical bore 514, and has a cylindrical bore 520 extending vertically therethrough within which a power piston 522 is slidably received. The power piston 522 corresponds to the power pistons 22 described earlier, and function in the same manner relative to the expansion engine of the invention. Spaced, O-ring seals 524 are carried in annular grooves on the power piston 522, to ensure against leakage of operating fluid from the operating chamber 510.

Received within the threaded inlet and outlet ends 506 and 508 of the bore 504 are inlet and outlet valve bodies 530 and 532, respectively, each having an enlarged, wrench-engageable head portion 534 or 536 thereon. An axial bore 538 extends through the inlet valve body 530, the inner end thereof including a tapered valve seat 540, and there being a packing socket 542 and an annular sealing ring groove 544 at the outer end thereof. The outlet valve body 532 has an axial bore 546 therethrough, terminating in a tapered valve seat 548 at its inlet end, and having a packing socket 550 and annular packing groove 552 at its outer end.

Inlet and outlet operating valve stems 554 and 556 are received in the axial bores 538 and 546, respectively, and carry frusto-conical valve heads 558 and 560 thereon that are seatable on the tapered valve seats 540 and 548. The valve heads 558 and 560 carry O-ring seals 562 in annular grooves thereon, to ensure against the escape of any operating liquid.

As is evident from FIG. 10, the valve stems 554 and 556 are substantially smaller in diameter than their respective axial bores 538 and 546, to provide a flow path thereabout for the operating fluid. Operating fluid is supplied to the inlet axial bore 538 through a transverse inlet port 564 in the valve body head 534, which has a fitting 566 threaded therein to connect a supply conduit thereto. Similarly, the valve body head 536 has a transverse outlet port 568 therein that receives a fitting 570, the latter being connected to the conduit leading to the cooling unit. The outer ends of the flow spaces about the valve stems 554 and 556 are closed by O-ring seals carried in the annular grooves 544 and 552, and sleeve seals 572 seated in the sockets 542 and 550.

The valve stems 554 and 556 project substantially from their respective valve bodies 534 and 536, and carry collars 580 and 582, respectively, thereon. Compressed between the collars 580 and 582 and their confronting inlet and outlet valve bodies 534 and 536 are coild springs 584, which function to normally hold the inlet and outlet valve structures in a tight VALVES CLOSED position. In order to provide for opening of the inlet and outlet valves, solenoids 586 and 588 are mounted outboard of the outer ends of the valve stems 554 and 556 by brackets 590 and 592, both secured to the housing block 502 by bolts 594. The electric solenoids 586 and 588 include operating cores 596 and 598 that are respectively engageable with the outer ends of the inlet and outlet valve stems 554 and 556, and which are effective when the solenoids 586 and 588 are operated to move the valve stems to a VALVES OPEN position, against the force of the coiled springs 584. When the solenoids are de-activated, the springs 584 effect instant and full closure of the inlet and outlet valves. Inward movements of the valve stems 554 and 556 are limited in extent by stop collars 600 carried thereon.

It will be readily appreciated that the inlet and outlet valve structure just described is simple in both concept and construction, and yet highly efficient in operation. Such will provide for the instant flow control capability preferred in the invention, and at the same time the structure is designed for long operating life without breakdown.

Received in the operating chamber 510 between the inlet and outlet valve bodies 534 and 536 is an electrical heating element assembly 610, comprising spaced support discs 612 and 614 made of conductive material, and having flanges 616 and 618 thereon, respectively, covered with insulative material 620 and which are snugly receivable in the chamber 510. The discs 612 and 614 have several flow openings 622 therethrough, as shown in FIG. 11, and support therebetween a plurality of coiled resistance heating elements 624 chosen to provide the quick heating characteristics needed for the invention.

The inlet-end support disc 612 is held separated from the inlet valve body 534 by insulated posts 626, thereby assuring adequate operating room for the valve stem 554. Similarly, spacer posts 628 hold the outlet-end support disc 614 away from the outlet valve body 536; in this instance, the posts 628, or at least one thereof, are conductive, whereby to establish a ground to the outlet valve body 536, from which a wire 630 is taken to ground. Electricity is supplied to the support plate 612 by an electrical conduit 632 brought through an axial bore 634 in the inlet valve stem 554, a small coil of the conduit 632 being provided at 636, to allow for reciprocal movements of the valve stem 554 relative to the support plate 612.

It is believed that the manner of operation for the power generating unit 500 is obvious, in light of all that has been discussed previously. Suffice it to say here that the unit 500 is compact, and especially lends itself to installations where a plurality of power units are utilized in side-by-side relationship.

Obviously, many additional embodiments and variations are possible in connection with the subject invention, without departing therefrom.

I claim:

1. An expansion engine, including: a plurality of operating chambers for receiving operating liquid; heating element means within each of said operating chambers; cooling unit means separate from said operating chambers, and including liquid pumping means; conduit means and valve means connecting said cooling unit means with each of said operating chambers, and operable for transmitting cool starting operating liquid from said cooling unit means to each of said operating chambers, and heated operating liquid from each of said operating chambers to said cooling unit means; a cylinder on each of said operating chambers, and in communication therewith; a power piston received within each of said cylinders; a plurality of power arms, one for each of said operating chambers, each of said power arms being mounted on a fulcrum, and the driving end thereof being arranged to be engaged by the power piston of the operating chamber associated with the power arm; a crankshaft, said crankshaft having a plurality of crank arm means thereon, one for each of said power arms, and each of said crank arm means being operably connected with the driven end of its associated power arm; and control circuit means for operating said valve means and said heating element means in a preselected, timed sequence in response to rotational movement of said crankshaft.

2. An expansion engine as recited in claim 1, wherein said heating element means in each of said operating chambers comprises an electrical heating element.

3. An expansion engine as recited in claim 2, wherein said valve means includes a solenoid inlet valve and a solenoid outlet valve for each of said operating chambers, said inlet and said outlet valves of each operating chamber being connected for simultaneous operation.

4. An expansion engine as recited in claim 3, wherein said control circuit means includes: first switch means connected with said inlet and said outlet valves on each operating chamber, and operable by said crank arm means when said crankshaft is rotated to close both of said valves while said electrical heating element is on, and to open said valves after said electrical heating element is turned off whereby to effect a change of operating liquid within the operating chamber; and second switch means connected with the electrical heating element of each operating chamber, and operable by rotation of said crankshaft to activate said electrical heating element for a predetermined period.

5. An expansion engine as recited in claim 4, wherein the individual ones of said plurality of crank arm means are spaced circumferentially about the axis of rotation of said crankshaft, and said first switch means comprises a pair of spaced microswitches associated with each crank arm means and disposed to be operable thereby.

6. An expansion engine as recited in claim 5, wherein said second switch means includes: a timing control disk arranged to be rotated with said crankshaft; a plurality of radially and circumferentially spaced arcuate contact strips disposed concentrically on one face of said control disk, one for each electrical heating element, each arcuate contact strip having an arc length somewhat less than the arc distance measured between its associated pair of microswitches;. and a brush for each contact strip, said brushes being connected into a control circuit with their respective electrical heating elements, and being mounted to be engaged by said contact strips upon rotation of said disk.

7. An expansion engine as recited in claim 6, wherein three operating chambers are utilized, the individual ones of said plurality of crank arm means being spaced 120° apart, the microswitches of each pair of microswitches being spaced 120° apart, each contact strip having an arc length of about 110°, and said disk being positioned relative to said crankshaft so that said heating elements come on after their associated valves are closed, and turn off before their said associated valves open.

8. An expansion engine as recited in claim 1, wherein said cooling unit means comprises: a cooling tank; a plurality of cooling cells formed within said cooling tank across the upper end thereof, and spaced above the bottom portion of said cooling tank; coolant coil means within each of said cooling cells; and compressor means connected to supply coolant to said coil means, said cooling tank having an inlet at the upper end thereof leading into the first of said plurality of cooling cells for admitting liquid to said cooling tank, said liquid flowing sequentially through said cooling cells and then falling into the bottom portion of said cooling tank, and said liquid pumping means being located within said bottom portion of said cooling tank.

9. An expansion engine as recited in claim 8, wherein said cooling cells are constructed to cause liquid to flow sequentially therethrough in a serpentine manner.

10. An expansion engine as recited in claim 1, wherein said power arms are each mounted so that the distance from said fulcrum to the driven end thereof is many times the distance from said fulcrum to the driving end thereof.

11. An expansion engine as recited in claim 10, wherein each of said crank arm means comprises a pair of crank arms projecting radially from the axis of said crank shaft and connected at their outer ends by a cam follower, the driven end of the associated power arm having an elongated slot therein for receiving said cam follower.

12. An expansion engine as recited in claim 1, including additionally a housing block for each of said plurality of operating chambers, each operating chamber comprising the central portion of an axial bore extending through the associated housing block, said valve means comprising inlet and outlet valves mounted in the opposite ends of said axial bore.

13. An expansion engine as recited in claim 12, wherein said inlet and outlet valves each comprise: a valve body having an axial bore therethrough, the inner end of said valve body axial bore having a tapered valve seat portion thereon; a reduced diameter cylindrical valve stem extending through said valve body axial bore, and having an enlarged, frusto-conical valve head thereon seatable upon said tapered valve seat portion; spring means arranged to normally seat said head on said valve seat portion; and electric solenoid means, operable for moving said valve stem against the force of said spring to open said valve.

14. An expansion engine as recited in claim 13, wherein said heating element means within said operating chamber is electrically powered, and wherein electricity is supplied thereto through an electrical conduit passed axially through one of said valve stems.

15. In an expansion engine, a power generating unit, comprising: a housing block having an axial bore extending therethrough, the central portion of said axial bore constituting an operating chamber; a power piston in communication with said operating chamber; electrical heating element means disposed within said operating chamber; control circuit means connected with said electrical heating element means, and operable to alternately actuate and deactivate said heating element means; inlet valve means mounted in one end of said axial bore; outlet valve means mounted in the other end of said axial bore; and means for operating said inlet and said outlet valves for opening both of said valves to admit operating liquid to said operating chamber, and to close both of said valves while said electrical heating element means is actuated to thereby expand said operating liquid to move said power piston.

16. In an expansion engine, a power generating unit as recited in claim 15, wherein said housing block is of substantial height and width, to provide thick walls for said operating chamber.

17. In an expansion engine, a power generating unit as recited in claim 15, wherein said inlet valve means and said outlet valve means each comprises: a valve body having an axial bore therethrough, the inner end of said valve body axial bore having a tapered valve seat portion thereon; a reduced diameter cylindrical valve stem extending through said valve body axial bore, and having an enlarged, frusto-conical valve head thereon seatable upon said tapered valve seat portion; and spring means arranged to normally seat said head on said valve seat portion, said operating means being engaged with said valve stem and being effective to move such against said spring means.

18. In an expansion engine, a power generating unit as recited in claim 17, wherein said operating means comprises a pair of electrical solenoids, one in engagement with each of said valve stems.

19. In an expansion engine, a power generating unit as recited in claim 17, wherein said electrical heating element means is supplied with electricity through a conduit extending axially through one of said valve stems.

* * * * *